United States Patent [19]

Sadler

[11] 4,178,701
[45] Dec. 18, 1979

[54] CYLINDRICAL PLANETARIUM PROJECTOR

[76] Inventor: Philip M. Sadler, 93 Hammond St., Cambridge, Mass. 02138

[21] Appl. No.: 856,252

[22] Filed: Dec. 1, 1977

[51] Int. Cl.² ............................................. G09B 27/00
[52] U.S. Cl. .................................................... 35/42.5
[58] Field of Search .......................... 35/42.5, 43, 47; 353/62; 355/132

[56] References Cited

U.S. PATENT DOCUMENTS

| | | | |
|---|---|---|---|
| 1,857,546 | 5/1932 | Hirschl | 35/47 |
| 2,632,359 | 3/1953 | Spitz | 35/42.5 |
| 2,693,130 | 11/1954 | Green | 35/425 |
| 2,763,183 | 9/1956 | Liversidge | 35/42.5 |
| 2,866,704 | 12/1958 | Korkosz et al. | 35/425 X |
| 3,251,143 | 5/1966 | Eisenhauer | 35/47 |

Primary Examiner—William H. Grieb
Attorney, Agent, or Firm—Martin M. Santa

[57] ABSTRACT

A planetarium projector and the method of making the projector is described wherein a light source is surrounded by an opaque enclosure having transparent spots or lines. The enclosure is fabricated from originally planar sheets of photographic film. The enclosure is preferably cylindrical however it may assume other shapes such as conical or a rectangular parallelepiped. The planar sheets of negative type of photographic film are patterned by exposure through a master transparent sheet of plastic on which star locations, zone plate lens, or lines representing geographical boundaries or other figures are drawn in opaque ink.

11 Claims, 11 Drawing Figures

CYLINDRICAL PLANETARIUM PROJECTOR

This invention relates to planetarium projectors and more particularly to a projector of the type which comprises a point light source surrounded by an opaque enclosure having transparent regions through which light passes from the source to a projection surface thereby indicating the locations and intensity of the stars and other celestial objects.

Prior art planetarium projectors of the above type have comprised a hollow opaque ball in which holes have been painstakingly drilled to assure exact placement of the holes. The size of the holes corresponds to the brightness of the star which is to be projected. The holes range in size from 0.1 mm to 2 mm in diameter in general. When so drilled, the ball is called a star ball and its orientation is made adjustable with respect to the projection surface to correspond to the sky at any hour, date, or location. It will be appreciated that a star ball made by drilling the individual holes in an opaque spherical surface, especially where the holes vary in diameter, is a time consuming, expensive method for making a projector.

Spheres have also been used to project constellation pictures and a geocentric Earth. However, these have been hand painted on transparent spheres and are consequently expensive.

It is therefore a primary object of this invention to provide a new type of star projector which is simple, easy, and cheap to fabricate and which is equivalent in performance to the existing star ball type of projectors.

It is further object of this invention to provide a projector which may be patterned to object constellations of star formations or geographical land masses as on a conventional terrestrial globe.

These and other objects are obtained in the instant invention by fabricating the projector in the shape of a cylinder from initially flat opaque patterned film. Transparent spots on the opaque film forming the wall and ends of the cylinder correspond to the holes drilled through the prior art opaque sphere. Alternatively, transparent lines on the opaque film connecting stars of a group form the constellations. Also transparent lines may form the outlines of land masses as viewed from the interior of a geocentric Earth.

It is a feature of this invention that the opaque film with the transparent star positions may be replicated from the master either photographically or by printing, both inherently inexpensive processes.

It is a further feature of this invention that lenses may be formed on or attached to the film prior to its being formed into a cylinder.

It is a further feature of this invention that the angle of tilt of the cylinder may be set by merely aligning a pointer attached to the cylinder gimbal with the location of the viewer presented on a map attached to the projector.

Other advantages, features, and objects of the invention will appear from the following description taken together with the drawings in which.

PREFERRED EMBODIMENT OF THE INVENTION

Figure 1:
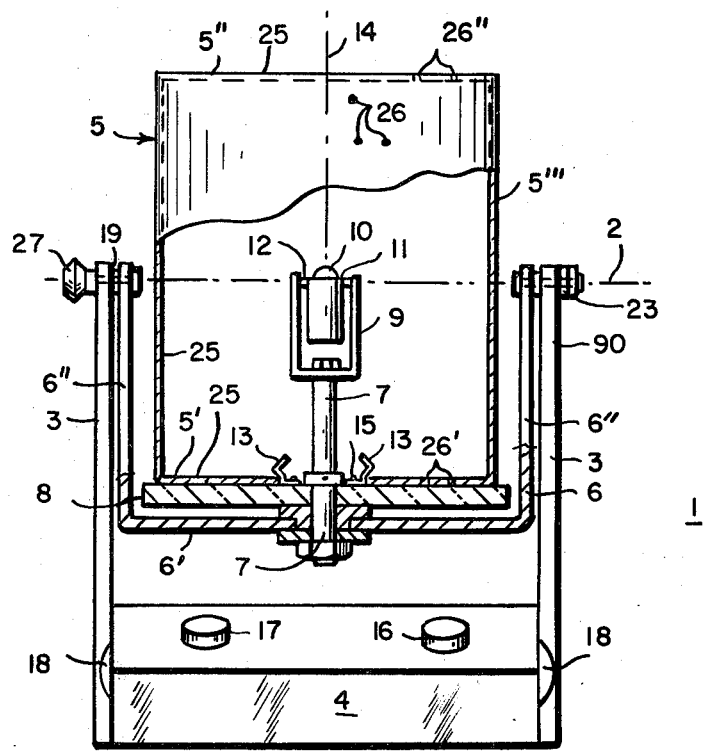
FIGS. 1 and 2 are front and side diagrammatic views of the planetarium projector of this invention.
Figure 2:
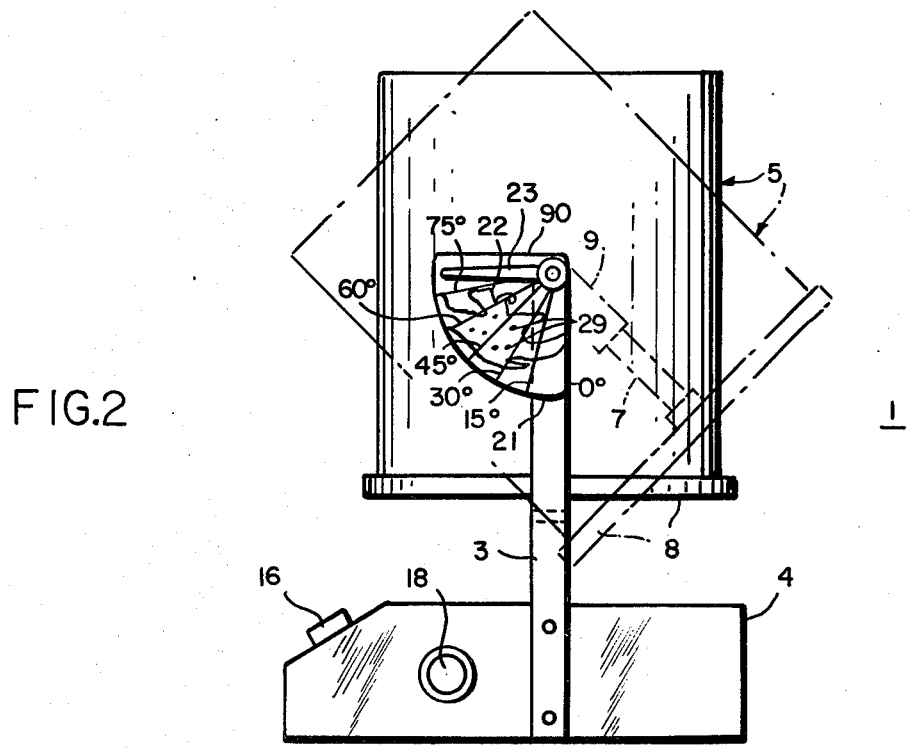

FIGS. 1 and 2 shows the planetarium projector 1 of this invention. It operates in the same manner as conventional star ball projectors which project light beams upon the interior of a spherical dome to form illuminated spots corresponding to the star positions and their intensity.

The projector 1 is shown in a front diagrammatic view in FIG. 1. It comprises a pair of vertically extending arms 3 supported on a base 4. A gimbal 6 pivotally supported about the axis 2 by the arms 3 near their upper end may be fixed in a position with respect to the arms 3 by tightening the knob 27 at the pivot point 19. The setting of the gimbal 6 with respect to the vertical provides the capability of adjusting the projector to project stars corresponding to those seen at different latitudes on the Earth as in conventional projectors. The lowermost portion 6' of the gimbal 6 has a shaft 7 secured to it and projecting in the direction of and in the plane of the arms 6" of the gimbal. A transparent support plate 8, preferably of plastic, is rotatably attached transverse to the shaft 7. Attached to the end of the shaft 7 is a second gimbal 9 whose plane is the plane of gimbal 6. A point source of light 10 is attached to a light-blocking surrounding cylinder 11 at the center of the open end thereof. The light source 10 and cylinder 11 are gimballed with respect to the shaft 12 of gimbal 9 so that the artifical horizon produced by the cylinder 11 remains horizontal regardless of the nonvertical position in which the gimbal 6 may be oriented. The cylinder 11 is attached to its gimbal 9 along the axis 2 so that the light 10 position in space does not substantially change when the gimbal 6 is set at the angle desired for projection.

A cylinder 5 of opaque film 25 is supported on the circular transparent support plate 8 by resting on the surface of support 8. Retaining springs 13 keep the cylinder 5 axis 14 in alignment with the shaft 7 when the gimbal 6 is tilted at an angle with respect to the vertical. Alternatively, the cylinder 5 could be taped with transparent tape to the support 8. The lower portion 5' of the cylinder has an opening 15 which allows the cylinder 5 to be slipped over the gimbal 9 before engaging the springs 13.

The base 4 contains a light intensity control 16 which is connected by wires not shown to the light 10. The other control 17 controls the intensity of the background illuminating lights 18.

The closed cylinder 5 comprises an opaque film 25 having transparent spots 26 distributed over its entire surface. The concentrated light source 10 is located at the radial and axial center of the cylinder 5. The locations and area of the transparent spots 26 are such that the light which is transmitted through the spots 26 projects onto the interior of a dome (not shown) to illuminate the interior with light spots corresponding to the positions and brilliance of selected stars. The ends 5', 5" are fastened at their edges to open ended cylinder 5''' by conventional means, such as tape or glue to form a closed cylinder 5 of film 25.

The cylinder 5 which is vertically supported by plate 8 and gimbal 6 may be tilted about axis 2 and rotated about axis 14 to allow the projection of the stars to correspond to that which will be observed at a particular location on the Earth at a particular time of the year. Side views of the projector 1 are shown in FIG. 2. The declination angles are plotted on card 21. The locations of principal cities on Earth map 22, drawn on the card 21, may be incorporated so that the pointer 23 may be set either to the proper declination angle or to the geographical region from which the stars are being viewed.

Figure 3:
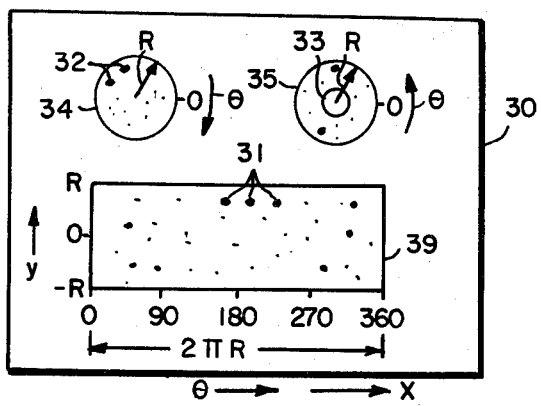
FIG. 3 is a master drawing of the cylinder layout for star projection.

The cylinder 5 is constructed by initially preparing a master drawing as in FIG. 3 by drawing with opaque ink the positions and sizes of the stars on a sheet 30 of transparent drafting film. The position and size of the opaque spot corresponding to the declination and right ascension angles of a particular star is corrected to take into consideration its ultimate placement on a cylinder rather than on a sphere. This master drawing is then photographically contact-printed on a sheet of high-resolution, high-contrast negative photographic film 25, thereby producing transparent spots on an intense black background.

The master drawing is prepared by plotting the positions of the stars which have a declination angle of $-45°$ to $+45°$ on a rectangular plot 39 of FIG. 3 where the right ascension angle $\theta$ of the star from the Greenwich meridian is plotted along the X axis and the position, y, of the star in the Y axis direction is determined by the equation $y = R \tan \phi$, where R is the radius of the cylinder to be formed and $\phi$ is the declination angle. The length of the plot 39 along the X axis is $2\pi R$.

Since the intensity of the projected star is proportional to the amount of light transmitted through a transparent spot 26 and since the light source is located at the center of the cylinder, the area of a transparent spot 26 is determined not only by the intensity of the star but also its declination angle. Therefore, corresponding opaque spots 31 are drawn on rectangular plot 39 on the drafting film 30. Thus, the area of the transparent spot 26 is related to the area of the hole that would be drilled in the prior art constant radius star ball divided by $\cos^2\phi$. Therefore, the opaque spots 31 are drawn on plot 30 at the locations and of the same area as the desired transparent spot 26.

The positions and sizes of the opaque spots 32, 33 corresponding to stars for declination angles of 45° to 90° and from $-45°$ to $-90°$, respectively, are plotted on the circles 34, 35, of FIG. 3. The distance of a spot from the center of the circle is determined by the relationship $r = R \cot \phi$, where $\phi$ is the ascension angle of the star and R is the radius of the circle (and the cylinder) and area of a spot is determined by dividing star ball hole area by $\sin^2\phi$.

Figure 4:
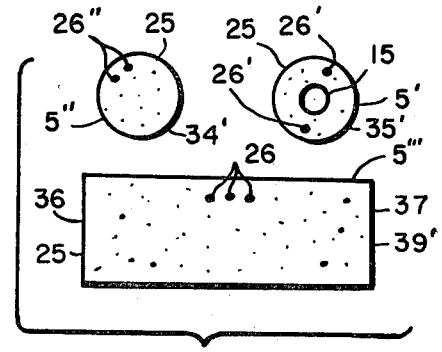
FIG. 4 shows the cylinder components before assembly as a star projector.
Figures 5, 6:
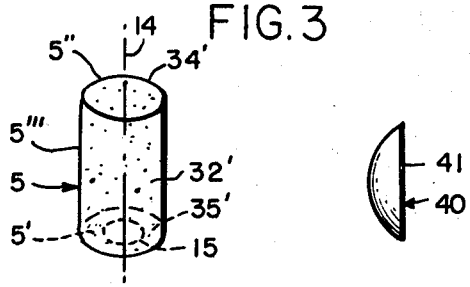
FIG. 5 shows the assembled cylinder for a star projector.
FIG. 6 shows a side view of a plano-convex lens.

The rectangle 39 and the circles 34, 35 may be drawn on the same sheet of drafting film 30 as shown in FIG. 3. This master drawing is then photographically contact-printed onto a sheet of high-resolution, high-contrast negative photographic film 25, producing transparent images on an intense black background. The resulting two circles 34', 35' and the rectangle 39' of the film 25 are then cut out of the sheet of film as shown in FIG. 4 and contain the transparent spots 26. The rectangular film 39' is formed into an open ended cylinder 5''' by gluing the edges 36, 37 together after which the circles 34', 35' of the film are glued or taped to the open ended cylinder 5''' to form the ends 5'', 5', respectively, of a closed end cylinder 5 as shown in FIG. 5. The center 15 of the circle 35' is removed to allow the cylinder to be slipped over the gimbal 9.

Figure 7:
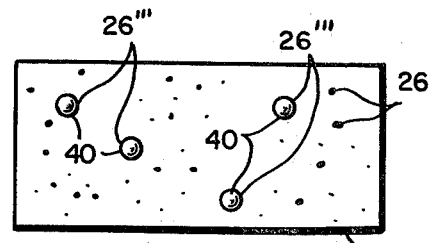
FIG. 7 shows the film in plane form with the lenses attached.

In order to project a nondiffuse spot of light, the light source should approximate a point source. The commercially available light source 10 commonly used with star balls is a good approximation of a point souce and has a filament which is approximately one millimeter in each dimension. In order to project a sharp image of the filament, the maximum hole through which light is projected should not be larger than the filament size of one millimeter. If this size hole is utilized to project the intensity of the brightest stars, approximately one thousand stars can be observed where the stars are projected with their approximately correct relative intensity. If more stars are desired to be projected, it is necessary to use holes larger than the filament. In this case, for the most brilliant stars, lenses should be used in order to collimate light from the filament upon the reflecting surface. This invention is especially suited for the use of lenses since the flat side 41 of a plano-convex lens 40, as shown in FIG. 6, may be glued over the spots 26''' larger than the filament, and therefore requiring lenses, while the film is flat, prior to be formed into a cylinder, as shown in FIG. 7, and also over the large (not shown) spots 26', 26'' in the circular end pieces of film 34', 35', which remain flat. Glass or plastic lenses approximately five millimeters in diameter are readily available at reasonable cost; and if used for those transparent areas greater than 1 millimeter, will allow up to 5,000 stars to be projected at their substantially true relative intensities. After the film 39' is formed into a cylinder 5''', the film is slightly distorted from the true cylindrical shape at the location of the lenses. This does not adversely affect the quality of the projection. The transparent spot may then be larger than the filament, and the lens may be larger than the spot if desired.

Figure 8:
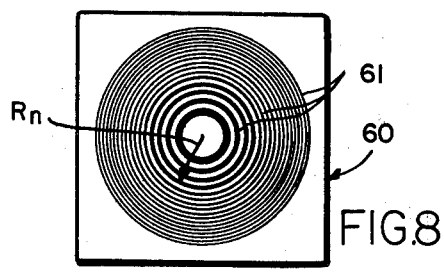
FIG. 8 shows a zone plate type of lens for the projection of a spot of light.

Although conventional lenses may be used as previously described, this invention is particularly adapted for use of a different type of lens, namely a zone plate lens. The zone plate lens 60, shown in FIG. 8, is seen to consist of a plurality of many concentric rings 61 of alternate opaque and transparent circles of predetermined width which have the effect of focusing the light. Since the zone plate lens 60 may be only approximately 5 mm in diameter and contains many rings 61, it is preferably prepared by drawing a greatly enlarged view, approximately 4 inches in diameter, and photographically reducing it to a 5 mm diameter film. These 5 mm film lenses may then be glued to the master drawing at the positions of the brightest stars. The lenses 60 and opaque spots 31, 32, 33 are then photographically transferred as before to a negative film.

The rings 61 have their inner and outer boundaries defined by circles whose radii are given by the equation $R_n = (n \cdot f \cdot \lambda)^{\frac{1}{2}}$, where n is the number of the circle, f is the focal length, the distance of the light bulb to the film, and $\lambda$ is a wavelength within the visible band which is chosen for the calculations. The rings 61 are opaque regions spaced with clear regions each within circle boundaries. It is apparent that the values of $R_n$ must be appropriately scaled when drawing the rings in order to cause them to be of the correct size when they are photographically reduced.

Figure 11:
FIG. 11 shows a zone plate type of lens for projection of a line of light.

Although the invention has been described in terms of projecting star positions it will be apparent that the invention is adapted to projecting transparent lines which may be in the form of star constellations or may form the outlines of geographical areas on the Earth. Thus this invention can be used as a projector of images which would be impractical or impossible to implement on a star globe using drilled holes.

Where transparent lines are to be projected, the zone plate lens assumes the form of a plurality of parallel opaque areas 110 of FIG. 11 varying in width and spacing. The distances $R_n$ of the boundaries of the opaque areas from the line 111 to be projected are given by the equation for $R_n$.

Figure 10:
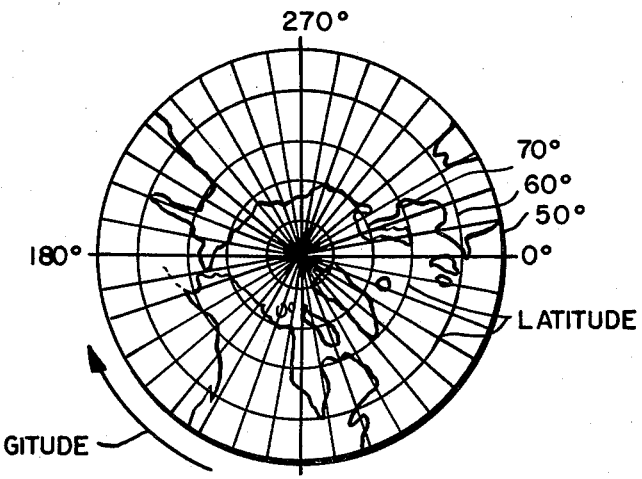
FIGS. 9 and 10 are plots of a portion of a geocentric Earth for assembly into a cylinder.
Figure 9:
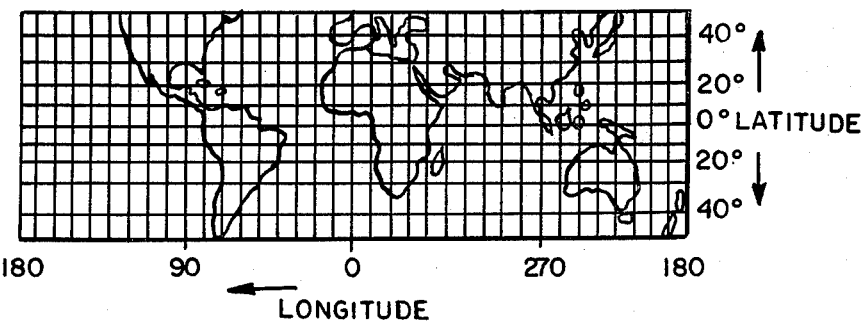

For geographical area projectors the positions of latitude and longitude of the outlines of the geographical areas are drawn on a master drawing as in FIG. 9 which shows the plot of the Earth land masses at +50° to −50° latitude. This plot when transferred to negative film would be formed into a cylinder 5‴. Note that the separation of the latitude lines becomes greater the further removed they are from the equator in accordance with the equation $R \tan \gamma$ where $\gamma$ is the angle of latitude measured from the equator and R is the radius of the cylinder to be formed from the plot of FIG. 9. FIG. 10 shows the plot of land and ice masses at twice the scale of FIG. 9 for the north polar region where the radial distance of the latitudes are given by $R \cot \gamma$. The south pole region is not shown but could be plotted in the same fashion as in FIG. 10.

In order to facilitate the use of the projector of this invention by children or those who may have difficulty grasping the concept of the necessity for tilting the cylinder to provide a projected image of the star pattern over the location at which the user is located, there is provided as an additional feature of this invention a slightly distorted view 22 of the geographical region in which the viewer may be located. For example, in FIG. 2 there is shown a view 22 of the North American continent on card 21 which is attached to the vertical arm 3 of the projector 1. The location of the principal cities of the United States is shown by dots 29 on the map. Depending upon the location of the user, the cylinder is tilted until the pointer 23 is aligned with the dot 29 corresponding to the location of the user by reference to the nearest principal city. This will set the cylinder 5 at the correct tilt angle without requiring that the angle of declination be known to the user. It will be recognized by those skilled in the art that this feature may be used with spherical type projectors also.

Although the preferred embodiment is a cylinder where the diameter of the cylinder is substantially equal to its length, which is believed to be an optimum dimension, it is apparent that the technique for designing this cylinder may be utilized with other cylinders having a diameter which may be greater or less than the length of the cylinder.

Althought the preferred embodiment of the invention has been described in terms of a cylinder formed from flat film, it will be apparent to those skilled in the art that this invention need not be so limited. More specifically the film through which images are projected may assume other shapes which are capable of being formed from the film which is cut out of a flat sheet. Examples of such shapes are cones, cubes and polyhedrons, such as the regular dodecahedron; a few of the many possible projection configurations that may be employed using this invention. It is understood that the locations of the holes and their areas may be determined by calculations analogous to those used in the design of the cylinder projector. Thus the invention should not be limited to projection cylinders but rather should include any shape which may be fabricated from sections cut out from an initially flat sheet of film.

Although the invention has been described in the preferred embodiment as replicating the master by contact printing onto a sheet of high-resolution, high-contrast photographic film it will be understood that other reproduction techniques are also applicable to this invention. For example, a silk screen printing technique can be used wherein the silk screen is generated from the master and subsequent copies on nonphotographic film are made from the silk screen. Because the resolution of a screen is not as great as that obtainable from photographic film, this technique would be limited to those applications where the number of stars to be projected would be in the vicinity of the brightest one thousand stars.

It is evident that those skilled in the art, once given the benefit of the foregoing disclosure, may make numerous other uses and modifications of, and departures from the specific embodiments described herein without departing from the inventive concepts. Consequently, the invention is to be construed as embracing each and every novel combination of features present in, or possessed by, the apparatus and techniques herein disclosed and limited solely by the scope and spirit of the appended claims.

What is claimed is:

1. A star projection device comprising,
an opaque film forming the surface of a nonspherical enclosure having a geometrical center and an axis of symmetry,
said enclosure being an assembly of pieces of originally flat film, which pieces of film are attached to each other near their edges to form said enclosure,
said film having transparent spots thereon whose positions and areas are representative of the true positions and brightness of selected stars when projected onto a viewing surface,
a point source of light positioned at the center of said enclosure,
a gimbal,
an enclosure support means attached to said gimbal,
means for attaching said enclosure to said support means to allow the enclosure's axis of symmetry to be tilted with respect to the vertical in response to positioning of said gimbal while maintaining the light source at the center of said enclosure,
said enclosure support means also being adapted to allow said enclosure to be rotated about its axis of symmetry while being supported by said support means,
whereby light projected through said spots and impinging on said viewing surface spaced from said light source provides a true representation of the star pattern as seen from a point on the Earth at a selected time corresponding to the selected tilt and rotation angle of said enclosure.

2. The star projection device of claim 1 wherein said enclosure is a cylinder and said axis of symmetry is its longitudinal axis.

3. The device of claim 2 comprising in addition lenses glued to selected transparent spots of said film.

4. The device of claim 2 wherein selected transparent spots are in the form of zone plate lens whereby focusing of the light occurs as it passes through said zone plate lens.

5. The device of claim 2 wherein
said support means is transparent to allow light from said source to project through said film spots and said support means.

6. The projection device of claim 1 wherein,
said viewing surface is a curved surface at a substantially constant distance from said light source.

7. A projection device comprising,
an opaque film in the form of a non-spherical enclosure having an axis of symmetry,
said enclosure being an assembly of pieces of originally flat film which pieces of film are attached to each other near their edges to form said enclosure,
said film having transparent regions thereon located at predetermined positions, and
means for providing a point source of light at the center of said enclosure,
a gimbal,
an enclosure supporting means attached to said gimbal,
means for attaching said enclosure to said support means to allow the enclosure's axis of symmetry to be tilted with respect to the vertical in response to positioning of said gimbal while maintaining the light source at the center of said enclosure,
said enclosure support means also being adapted to allow said enclosure to be rotated about its axis of symmetry while being supported by said support means,
whereby light from said source is projected through said transparent regions to impinge upon a spherical surface and present thereby an undistorted representation of that which was represented by said transparent regions.

8. The projection device of claim 7 wherein said enclosure is a cylinder and said axis of symmetry is its longitudinal axis.

9. A method for making a projection cylinder comprising
drawing a master within the borders of a rectangle and two circles on a flat sheet of transparent film of the image to be projected, the length of said rectangle being the product of $2\pi$ and the radius of said circles,
transferring said master image onto a negative film to provide a negative thereof on an otherwise opaque film,
cutting from said negative film the rectangle and the two circles,
forming a cylinder from said rectangular film,
attaching said circles at their peripheries to the open ends of said cylinder to form a projection cylinder.

10. The method of claim 9 comprising in addition
attaching lenses to selected said transparent regions of said rectangle and circles prior to forming said projection cylinder.

11. A method for making a projection enclosure comprising
drawing a master image to be projected on a flat sheet of transparent film,
transferring said master image onto a negative film to provide a negative thereof on an otherwise opaque film,
cutting regions of said master image from said negative film,
forming said enclosure by attaching said film sections to each other at their edges.

* * * * *